United States Patent Office 2,822,395
Patented Feb. 4, 1958

2,822,395

PRODUCTION OF AMINES

Walter Theodore Dent, Norton-on-Tees, England, assignor to Imperial Chemical Industries Limited, London, England, a corporation of Great Britain No Drawing. Application February 21, 1955
Serial No. 489,809

Claims priority, application Great Britain March 5, 1954

7 Claims. (Cl. 260—576)

This invention relates to the production of amines.

It has already been proposed to produce amines having a structure:

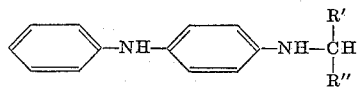

where R' and R" are alkyl groups, by hydrogenating p-nitro, p-nitroso or p-amino-diphenylamine in the presence of a ketone. In particular, it has been proposed to use the nitroso compound in view of its relative ease of preparation.

For example, p-nitrosodiphenylamine may be hydrogenated in the presence of methyl ethyl ketone, whereby 4-sec.butylaminodiphenylamine is produced. This process, although of considerable technical importance, involves numerous disadvantages:

(a) p-Nitrosodiphenylamine is produced most conveniently by reacting diphenylamine with nitrous acid to give N-nitrosodiphenylamine; this compound is re-arranged to p-nitrosodiphenylamine by treating with hydrochloric acid. During this rearrangement, small amounts of covalent organic chlorine-containing compounds are produced; these compounds tend to poison the catalyst used in the hydrogenation step.

(b) The nitroso compound is relatively insoluble in organic solvents; thus, the ratio of ketone to nitroso compound which must be employed is high. For example, a ketone:nitroso compound molar ratio of the order of 60:1 has been found advantageous. A process of this type is wasteful since the unchanged ketone, and alcohol formed during the reaction by hydrogenation of the ketone, must be removed by distillation. Furthermore, if it is desired in the reductive alkylation reaction to utilise the alcohol formed, this alcohol must be hydrogenated in a separate step. Also the ketone hydrogenation to an alcohol is an exothermic reaction, and this increases the difficulty of controlling the temperature of the reaction.

(c) In the reductive alkylation of a nitroso compound with a ketone according to the equation

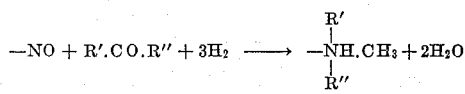

two moles of water are formed per mole of amine produced. Similarly, when a nitro compound is used, three moles of water are formed in the reaction. This water formation results in the reaction being highly exothermic, and therefore makes temperature control difficult. Also, the water formed renders the starting materials less soluble in the solvent.

We have now found that amines of the type disclosed above are produced in good yield and by a process which minimises the above-mentioned difficulties by using p-phenylamino-azo-benzene in place of p-nitroso or p-nitro-diphenylamine.

Thus, according to the present invention, amines having a structure:

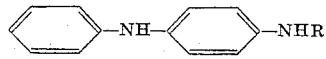

where R is a cycloaliphatic radical, or a radical having a structure:

where R' and R" are alkyl, aryl or aralkyl groups, are produced by reacting diphenylamine with a benzene diazonium salt, whereby p-phenylaminoazobenzene, which has a structure:

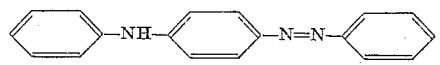

is produced, and subsequently hydrogenating this compound in the presence of the appropriate ketone, whereby there is produced a mixture of amines having structures:

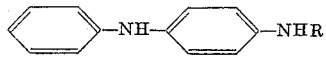

and

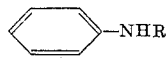

The process of the present invention may, if desired, be carried out using substituted diphenylamines; for example, it is possible to use diphenylamines containing alkyl or alkoxy groups situated in one or both of the benzene rings ortho or meta to the NH group. Also, if desired, a substituted benzene diazonium salt may be employed; the substituent present in this diazonium salt may, for example, facilitate the coupling reaction between the diazonium salt and the diphenylamine, but it should be noted that this substituent will not, of course, be present in the desired amine produced.

As an example of the process of the present invention, 4-isopropylaminodiphenylamine may be produced by coupling diphenylamine with a benzene diazonium salt, and reductively alkylating the p-phenylaminoazobenzene by hydrogenation in the presence of acetone. Similarly to obtain 4($\alpha$-phenyl ethyl)amino-diphenylamine, p-phenylaminoazobenzene is reductively alkylated using acetophenone as the ketone, while, to obtain 4-cyclohexylaminodiphenylamine, cyclohexanone is used.

Catalysts suitable for use in the hydrogenation step include those comprising copper, or a metal selected from group VIII of the periodic system. In particular, copper chromite, finely divided nickel, and finely divided platinum or platinum oxide are convenient. When using a finely divided nickel or platinum catalyst, this may be supported on a suitable inert material.

The reductive alkylation step is preferably carried out continuously in the liquid phase at a temperature within the range of 100° to 180° C., and at a pressure of 10 to 300 atmospheres gauge. In particular, reaction at a temperature of 120° to 160° C. and at a pressure of 30 to 100 atmospheres gauge gives good results.

The reaction between the diazonium salt and the diphenylamine is conveniently carried out by adding an aqueous methanolic solution of a benzene diazonium chloride to a methanolic solution of the diphenylamine containing hydrochloric acid. The reaction is preferably carried out at a temperature of the order of −10° C. On standing, the hydrochloride of the azo compound separates out and can be filtered off. For example, when using benzene diazonium chloride and diphenylamine, the hydrochloride of 4-phenylaminoazobenzene is produced.

In carrying out the reaction between a diazonium salt and diphenylamine, it is advantageous to use an excess of the former. By operating in this manner an improved yield of azo-compound is obtained. For example, in the reaction between diphenylamine and benzene diazonium chloride at a temperature of −10° C., I have found that by using a 10% excess of benzene diazonium chloride (calculated on the amount of aniline employed) over that stoichiometrically required, a 75% yield of p-phenylaminoazobenzene was obtained. On increasing the excess of benzene diazonium chloride to 20%, an 81% yield of azo-compound was obtained. When using a 55% excess of benzene diazonium chloride, the yield of azo-compound increased to 91%. An excess of benzene diazonium chloride over that stoichiometrically required is not wasted since this excess can be recycled for subsequent reaction with diphenylamine. It is undesirable, however, to increase too greatly the volume of reactants, because of increased operating difficulties, and, in consequence, it is advisable to use a 30% to 50% stoichiometric excess of diazonium salt.

In view of the deleterious effect exerted by traces of organic compounds containing chlorine on the catalyst employed in the hydrogenation step, it is desirable to remove chlorine-containing impurities as fully as possible from the azo compound. This may be done either by solvent extraction or by contacting a solution of the azo compound with an anion exchange resin.

The production of amines by the process of the present invention has the following advantages:

(a) The formation of traces of organic chlorine-containing compounds which are co-valent in nature and which cannot easily be removed is much less likely than in the production of, for example, p-nitrosodiphenylamine as an intermediate. Thus, there is less risk of poisoning the catalyst employed in the hydrogenation step.

(b) The p-phenylaminoazobenzene is very soluble in organic solvents. Thus, the ketone: p-phenylaminoazobenzene ratio which is conveniently employed can be substantially less than the ketone: p-nitrosodiphenylamine ratio. Hence, excessive heat utilisation, necessary for the removal of excess ketone and alcohol formed by the hydrogenation of the ketone, is avoided.

(c) Only one mole of water is liberated for each mole of amine produced; thus the reductive alkylation of p-phenylaminoazobenzene is less exothermic than the reductive alkylation of 4-nitroso or 4-nitrodiphenylamine.

(d) In addition, it is important to note that in the present process the material to be submitted to reductive alkylation, for example, p-phenylaminoazobenzene, is produced in a single step from the diphenylamine, whereas p-nitroso-diphenylamine requires two stages for its production from diphenylamine.

The amines having a structure:

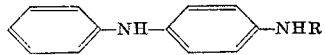

where R is a cycloaliphatic radical, or a radical

where R' and R" are alkyl, aryl, or aralkyl groups, may be used as antioxidants. They may be used in stabilising compounds liable to deterioration arising from peroxide formation, such as petrols, aldehydes, ethers, esters of unsaturated carboxylic acids and unsaturated hydrocarbons or mixtures containing these materials. The antioxidants should be present in an amount of 0.0002 to 3% by weight of the substance to be stabilised, and more preferably in an amount of 0.001 to 0.3% by weight.

*Example 1*

700 gm. of diphenylamine were dissolved in 10 litres of methanol. After the addition of 1200 ml. of concentrated hydrochloric acid, the solution was cooled to 10° C.

A second solution was prepared by the addition of 330 gm. of sodium nitrite in 400 ml. of water to 424 gm. of aniline dissolved in 3000 ml. of methanol and 1200 ml. of concentrated hydrochloric acid, the temperature being maintained below 5° C.

The second solution described above was cooled to −10° C. and added to the diphenylamine solution. The reaction mixture was maintained overnight at a temperature of −10° C., when p-phenylaminoazobenzene hydrochloride slowly separated from the purple solution. The solid hydrochloride was filtered off, washed with water, and then mixed with excess aqueous ammonia. p-Phenylaminoazobenzene separated as a yellow-brown precipitate which had a chlorine content of 2,005 p. p. m.

This crude product was dissolved in acetone; two layers, one rich in acetone and the other in water, were formed. The total bulk of liquid was passed down a column packed with the anion exchange resin sold under the registered trademark "Amberlite" I. R. A. 400(OH). From the product, 858 gm. of p-phenylaminoazobenzene, m. pt. 83–86° C. were obtained. This compound had a chlorine content of 70 p. p. m. and the yield, based on the quantity of diphenylamine employed, was 76%.

850 gm. of p-phenylaminoazobenzene were dissolved in 3,400 gm. of acetone. This solution was passed at a rate of 680 gm. per hour over one litre of a copper chromite catalyst maintained at 165° C. Hydrogen was passed over the catalyst at a space velocity of 550 litres per hour, and the pressure was maintained at 50 atmospheres.

After stripping off acetone, isopropanol and water from the product, 911 gm. of crude product remained. On vacuum distillation, this gave 269 gm. of almost pure N-isopropylaniline and 561 gm. of almost pure 4-isopropylaminodiphenylamine. The yield of this latter compound, based on the amount of p-phenylaminoazobenzene employed, was 80%.

*Example 2*

700 gm. of diphenylamine were dissolved in 12 litres of methanol. After the addition of 1200 ml. of concentrated hydrochloric acid, the solution was cooled to 10° C.

A second solution was prepared by the addition of 460 gm. of sodium nitrite in 600 ml. of water to 600 gm. of aniline dissolved in 4000 ml. of methanol and 1200 ml. of concentrated hydrochloric acid.

These solutions were then reacted and the product treated as described in Example 1. As in this example, crude, yellow-brown p-phenylaminoazobenzene was obtained. This compound had a chlorine content of 1145 p. p. m.

In place of the treatment with an anion exchange resin, this crude product was treated with ether. The small aqueous layer was removed and the ether layer, after filtration, heated to remove the ether. 1024 gm. of p-phenylaminoazobenzene, m. pt. 84–85° C., and containing 51 p. p. m. of chlorine were obtained. This corresponds to a yield of 91%, based on the weight of diphenylamine employed. This p-phenylaminoazobenzene was used in the preparation of 4-isopropylaminodiphenylamine, as described in Example 1.

*Example 3*

22.4 gm. of aniline, dissolved in 150 ml. of methanol and 52 ml. of concentrated hydrochloric acid, were diazotised at 0° to 2° C. by the addition of 20 gm. of sodium nitrite dissolved in 25 ml. of water. After cooling to −10° C., this diazotised solution was added to a solution of 33.8 gm. of diphenylamine dissolved in 500 ml. of methanol and 52 ml. of concentrated hydrochloric acid, previously cooled to 8° to 10° C. After the mixture had stood at about −15° C. for 72 hours, solid p-phenylaminobenzene hydrochloride was filtered off, washed with water and basified with aqueous ammonia. After further washing with water, the p-phenylaminoazobenzene was dried. 44.3 gm. of substantially pure p-phenylaminoazobenzene was obtained, m. pt. 85° to 86° C.; the yield of this compound, based on the amount of diphenylamine employed, was 81%.

The p-phenylaminoazobenzene was dissolved in ether, the solution dried over sodium carbonate, and filtered. The ether was distilled off from the solution, giving a substantially chlorine-free product.

This product was reductively alkylated by hydrogenation in the presence of 500 ml. of methyl ethyl ketone, using 1 gm. of a 30% by weight platinum-on-charcoal catalyst. The reaction was carried out for 8 hours at 80° C., then for 16 hours at 160° C., the maximum hydrogen pressure employed being 100 atmospheres. From the product, 22.1 gm. of N. sec-butyl aniline and 33.3 gm. of 4-sec-butyl-aminodiphenylamine, m. pt. 49° to 50°, were obtained. The yield of this latter compound, based on p-phenyl-aminoazobenzene, was 85.5%, and, based on the diphenylamine initially employed, 69.3%.

*Example 4*

100 gm. of p-phenylaminoazobenzene (produced as described in Example 1) were dissolved in 500 ml. of cyclohexanone and hydrogenated for 6 hours at 60° C. and then for 24 hours at 160° C., using a 30% by weight platinum-on-charcoal catalyst. The maximum hydrogen pressure employed was 100 atmospheres. From the product, 86.5 gm. of 4-cyclohexylaminodiphenylamine, m. pt. 110° to 114° C., were obtained. The yield of this compound, based on the amount of p-phenylaminoazobenzene employed, was 89%.

*Example 5*

This example illustrates the feature of recycling unreacted benzene diazonium chloride.

(A) To 0.3 mole of aniline dissolved in 600 mls. of methanol and 100 mls. of concentrated hydrochloric acid was added 0.3 mole of sodium nitrite in 20 mls. of water, the mixture being maintained at a temperature of about 0° C. 0.2 mole of diphenylamine in 100 mls. of methanol was added to the resulting solution maintained at 0° C. When the addition was complete the mixture was maintained at about −10° C. for 24 hours, and then filtered. After treatment with an excess of aqueous ammonia the residue gave 46 grams of p-phenylaminoazobenzene, m. pt. 82°–83°. This represents a yield of 84% based on the amount of diphenylamine used.

It will be observed that in this part of the example 0.3 mole of diazonium salt was coupled with 0.2 mole of diphenylamine so that the filtrate from the coupling reaction contained unreacted diazonium salt. This filtrate was used in part B of the example as described below.

(B) To the filtrate from (A) was added a solution formed by adding 0.2 mole of sodium nitrite in 20 mls. of water to 0.2 mole of aniline in 100 mls. methanol and 45 mls. of concentrated hydrochloric acid. To this solution maintained at a temperature of 0° C. was added 0.2 mole of diphenylamine. After the mixture had stood at about −20° C. for 2 hours it was worked up as described in (A) and 50.4 grams of p-phenylaminoazobenzene, m. pt. 81° to 82° C. were obtained. This represents a yield of 92% based on the weight of diphenylamine used.

(C) The filtrate from (B) was employed in a subsequent reaction identical in nature to the method given above in part (B) of the example. The yield of p-phenyl-aminoazobenzene in this part of the example was 49.6 grams which represents a yield of 91% based on the amount of diphenylamine used.

The p-phenylaminoazobenzene produced in this example was employed for the production of 4-isopropyl-amino-diphenylamine, as described in Example 1.

*Example 6*

17 grams of aniline were mixed with 100 mls. of methanol and 50 mls. concentrated hydrochloric acid. This mixture was cooled to 0° C. and diazotised by the addition of 12.7 grams of sodium nitrite dissolved in the minimum amount of water. This mixture was added to a solution of 30 grams of 3:3′-dimethyldiphenylamine, 80 mls. methanol and 50 mls. of concentrated hydrochloric acid. The temperature was maintained at about −10° C. Precipitation commenced immediately and was complete after about 45 minutes. The solid was filtered, washed, and treated with aqueous ammonia solution. It was then extracted with ether; on evaporating the ether, 24.8 grams of 2-methyl-4-(3-methylphenyl-amino) azobenzene were obtained, m. pt. 99° C. This corresponds to a yield of 34%.

38.5 grams of the substituted azobenzenes produced as described above were dissolved in 500 mls. of methyl ethyl ketone. 1 gram of a catalyst comprising 30% by weight of platinum supported on charcoal was added and the mixture heated to 80° C. for 6 hours in a hydrogen pressure of 80 to 100 atmospheres. After a further period of heating at 160° C. for 24 hours the reaction mixture was separated from the catalyst by filtration and washed with 100 mls. of methyl ethyl ketone. The combined filtrate was distilled giving a fraction weighing 23 grams which boiled between 160° and 168° C. at 0.5 mm. Hg pressure. This fraction was redistilled, giving 22 grams of a product boiling between 154° to 157° C. at 0.5 mm. pressure. This product was essentially 3:3′-dimethyl-4-sec-butylaminodiphenylamine.

*Example 7*

25.7 grams of para-toluidine were dissolved in 150 mls. methanol and 52 mls. concentrated hydrochloric acid, and diazotised at about 0° C. by the addition of 17 grams of sodium nitrite in 25 mls. of water. This diazotised solution was then added to a solution of 33.8 grams of diphenylamine in 500 mls. of methanol and 52 mls. of concentrated hydrochloric acid. The resulting mixture was kept at −10° C. for 16 hours, filtered, and the residue washed with distilled water. The washed residue was treated with an aqueous solution of ammonia and then extracted with ether. The ether extract was washed, dried and evaporated to give 25 grams of a product melting at 83° to 98° C. On recrystallisation from light petroleum boiling at 60° to 80° C., 23 grams of 4-phenylamino-4′-methylazobenzene melting at 116° to 118° C. were obtained.

The 23 grams of this substituted azobenzene and 500 mls. of methyl ethyl ketone were treated as described in the second part of Example 6. On distillation, the product gave 10 grams of N-sec-butyl p-toluidine, and 12 grams 4-sec-butylaminodiphenylamine, melting point 46° to 47° C.

*Example 8*

Example 7 was repeated using meta-toluidine in place of p-toluidine. 28.7 grams of 4-phenylamino-3′-methyl-azobenzene were obtained, which, after recrystallisation, melted at 68° to 68.5° C. This compound was reductively alkylated with methyl ethyl ketone as described in the second part of Example 6; 4-sec-butylaminodiphenylamine, melting at 45° to 47° C., was obtained.

*Example 9*

Example 7 was repeated using p-anisidine in place of p-toluidine. 4-phenylamino-4′-methoxy azobenzene was obtained, which after recrystallisation, melted at 112° C. On reductively alkylating 15 grams of this compound as described in the second part of Example 6 with methyl ethyl ketone, 9.1 grams of 4-sec-butylaminodiphenyl-amine were obtained, melting point 48° C.

I claim:

1. A process for the production of 4-aminodiphenyl-amines in which one of the hydrogen atoms of the 4-amino group is replaced by a saturated hydrocarbon radical, which comprises coupling a diphenylamine with an amount of a benzene diazonium salt exceeding the stoichiometric amount thereof by from 10 to 55% by weight, and reductively alkylating the resulting phenylaminoazobenzene with a saturated ketone at 100° to 180° C., and at 10 to 300 atmospheres in the presence of a metal hydrogenation catalyst selected from the group consisting of copper and group VIII metals.

2. A process as claimed in claim 1 in which said reductive alkylation step is carried out continuously in the liquid phase at a temperature within the range of 120° to 160° C., and at a pressure of 30 to 100 atmospheres gauge.

3. The process defined by claim 1 wherein said reductive alkylation is carried out in the presence of acetone, whereby 4-isopropyl-aminodiphenylamine is produced.

4. The process defined by claim 1 wherein said reductive alkylation is carried out in the presence of acetophenone, whereby 4($\alpha$-phenyl-ethyl) amino-diphenylamine is produced.

5. The process defined by claim 1 wherein said reductive alkylation is carried out in the presence of cyclohexanone, whereby 4-cyclohexylamino-diphenylamine is produced.

6. The process defined by claim 1 wherein subsequent to said coupling reaction and prior to said reductive alkylation, said phenyl amino azo benzene is substantially freed from organic chlorine-containing compounds by extraction with a solvent for said compounds.

7. The process defined by claim 1 wherein subsequent to said coupling reaction and prior to said reductive alkylation, said phenyl amino azo benzene is substantially freed from organic chlorine-containing compounds by treatment of the reaction mixture with an anion exchange resin.

References Cited in the file of this patent

UNITED STATES PATENTS

| | | |
|---|---|---|
| 1,817,958 | Zwilgmeyer | Aug. 11, 1931 |
| 2,388,606 | Emerson | Nov. 6, 1945 |
| 2,388,608 | Emerson | Nov. 6, 1945 |
| 2,414,031 | Emerson | Jan. 7, 1947 |
| 2,714,104 | Chenicek et al. | July 26, 1955 |

OTHER REFERENCES

Groggins: "Unit Processes in Organic Synthesis," (4th edition), 1952, pp. 164, 165, 166, 167.